US010510304B2

(12) United States Patent
Dunn et al.

(10) Patent No.: US 10,510,304 B2
(45) Date of Patent: Dec. 17, 2019

(54) DYNAMIC DIMMING LED BACKLIGHT FOR LCD ARRAY

(71) Applicant: Manufacturing Resources International, Inc., Alpharetta, GA (US)

(72) Inventors: William Dunn, Alpharetta, GA (US); Rick DeLaet, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 15/673,580

(22) Filed: Aug. 10, 2017

(65) Prior Publication Data

US 2018/0047345 A1 Feb. 15, 2018

Related U.S. Application Data

(60) Provisional application No. 62/373,238, filed on Aug. 10, 2016.

(51) Int. Cl.
*G09G 3/34* (2006.01)
*G02F 1/1333* (2006.01)
(Continued)

(52) U.S. Cl.
CPC ......... *G09G 3/342* (2013.01); *G02F 1/13336* (2013.01); *G02F 1/133603* (2013.01);
(Continued)

(58) Field of Classification Search
CPC .... G09G 3/342; G09G 3/3426; G09G 3/3607; G09G 2320/0646; G09G 2360/16;
(Continued)

(56) References Cited

U.S. PATENT DOCUMENTS 4,271,410 A 6/1981 Crawford
4,399,456 A 8/1983 Zalm
(Continued)

FOREIGN PATENT DOCUMENTS

CN 1613264 A 5/2005
CN 101777315 A 7/2010
(Continued)

OTHER PUBLICATIONS

AMS AG, TCS3404, TCS3414, Digital Color Sensors, Apr. 2011, 41 pages, Texas Advanced Optoelectronic Solutions Inc. is now ams AG.

(Continued)

*Primary Examiner* — Premal R Patel
(74) *Attorney, Agent, or Firm* — Standley Law Group LLP; Jeffrey S. Standley; Eric M. Gayan

(57) ABSTRACT

A LCD assembly having a dynamic dimming LCD backlight and a plurality of individual LCD displays positioned in front of the backlight, and a method for controlling a backlight of such an assembly. The backlight is divided into an array of individually controllable subsections, and adjacent edges of the LCD displays are used to define virtual boundary lines relative to the backlight subsections. Initial desired luminance values are determined for each subsection of the backlight based on incoming video data. A difference between desired luminance values for each pair of adjacent backlight subsections that border the virtual boundary lines is calculated and compared to a threshold value. Based on the comparisons, adjustments may be made to the desired luminance value of the backlight subsections.

20 Claims, 11 Drawing Sheets

TO BACKLIGHT 10
351
VIDEO PLAYER
DISPLAY RECEIVER BOARD
375
TO BACKLIGHT 10
352
DISPLAY RECEIVER BOARD
VIDEO PLAYER
376
300
301
302
303
TO BACKLIGHT 10
VIDEO PLAYER
DISPLAY RECEIVER BOARD
353
377
TO BACKLIGHT 10
DISPLAY RECEIVER BOARD
VIDEO PLAYER
378
354

(51) Int. Cl.
*G02F 1/1335* (2006.01)
*G09G 3/36* (2006.01)

(52) U.S. Cl.
CPC ..... *G02F 1/133606* (2013.01); *G09G 3/3607* (2013.01); *G02F 2001/133601* (2013.01); *G09G 2300/026* (2013.01); *G09G 2320/0276* (2013.01); *G09G 2320/0646* (2013.01); *G09G 2320/0686* (2013.01); *G09G 2360/16* (2013.01); *G09G 2360/18* (2013.01)

(58) Field of Classification Search
CPC ....... G09G 2360/18; G09G 2320/0276; G09G 2320/0686; G09G 2300/026; G02F 1/133606; G02F 1/13336; G02F 1/133603; G02F 2001/133601
See application file for complete search history.

(56) References Cited

U.S. PATENT DOCUMENTS 4,456,910 A 6/1984 DiMassimo et al.
4,571,616 A 2/1986 Haisma et al.
4,593,978 A 6/1986 Mourey et al.
4,753,519 A 6/1988 Miyatake
5,029,982 A 7/1991 Nash
5,049,987 A 9/1991 Hoppenstein
5,081,523 A 1/1992 Frazier
5,088,806 A 2/1992 McCartney et al.
5,115,229 A 5/1992 Shalit
5,162,645 A 11/1992 Wagensonner et al.
5,162,785 A 11/1992 Fagard
5,351,201 A 9/1994 Harshbarger, Jr. et al.
5,402,141 A 3/1995 Haim et al.
5,565,894 A 10/1996 Bates et al.
5,656,824 A 8/1997 den Boer et al.
5,663,952 A 9/1997 Gentry, Jr.
5,694,141 A 12/1997 Chee
5,751,346 A 5/1998 Dozier et al.
5,835,074 A 11/1998 Didier et al.
5,886,731 A 3/1999 Ebisawa
6,027,222 A 2/2000 Oki
6,032,126 A 2/2000 Kaehler
6,055,012 A 4/2000 Haskell et al.
6,075,556 A 6/2000 Urano et al.
6,091,777 A 7/2000 Guetz et al.
6,094,457 A 7/2000 Linzer et al.
6,100,906 A 8/2000 Asaro et al.
6,153,985 A 11/2000 Grossman
6,192,083 B1 2/2001 Linzer et al.
6,259,492 B1 7/2001 Imoto et al.
6,292,157 B1 9/2001 Greene et al.
6,292,228 B1 9/2001 Cho
6,297,859 B1 10/2001 George
6,326,934 B1 12/2001 Kinzie
6,359,390 B1 3/2002 Nagai
6,392,727 B1 5/2002 Larson et al.
6,417,900 B1 7/2002 Shin et al.
6,421,103 B2 7/2002 Yamaguchi
6,421,694 B1 7/2002 Nawaz et al.
6,428,198 B1 8/2002 Saccomanno et al.
6,536,041 B1 3/2003 Knudson et al.
6,546,294 B1 4/2003 Kelsey et al.
6,553,336 B1 4/2003 Johnson et al.
6,587,525 B2 7/2003 Jeong et al.
6,642,666 B1 11/2003 St-Germain
6,674,463 B1 1/2004 Just et al.
6,690,726 B1 2/2004 Yavits et al.
6,697,100 B2 2/2004 Tatsuzawa
6,698,020 B1 2/2004 Zigmond et al.
6,712,046 B2 3/2004 Nakamichi
6,812,851 B1 11/2004 Dukach et al.
6,820,050 B2 11/2004 Simmon et al.
6,825,899 B2 11/2004 Kobayashi
6,850,209 B2 2/2005 Mankins et al.
6,996,460 B1 2/2006 Krahnstoever et al.
7,038,186 B2 5/2006 De Brabander et al.
7,057,590 B2 6/2006 Lim et al.
7,103,852 B2 9/2006 Kairis, Jr.
7,136,415 B2 11/2006 Yun et al.
7,174,029 B2 2/2007 Agostinelli et al.
7,304,638 B2 12/2007 Murphy
7,307,614 B2 12/2007 Vinn
7,319,862 B1 1/2008 Lincoln et al.
7,358,851 B2 4/2008 Patenaude et al.
7,385,593 B2 6/2008 Krajewski et al.
7,391,811 B2 6/2008 Itoi et al.
7,480,042 B1 1/2009 Phillips et al.
7,518,600 B2 4/2009 Lee
7,573,458 B2 8/2009 Dunn
7,581,094 B1 8/2009 Apostolopoulos et al.
7,614,065 B2 11/2009 Weissmueller et al.
7,636,927 B2 12/2009 Zigmond et al.
7,669,757 B1 3/2010 Crews et al.
7,714,834 B2 5/2010 Dunn
7,764,280 B2 7/2010 Shiina
7,810,114 B2 7/2010 Flickinger et al.
7,813,694 B2 10/2010 Fishman et al.
7,825,991 B2 11/2010 Enomoto
7,924,263 B2 4/2011 Dunn
7,937,724 B2 5/2011 Clark et al.
7,988,849 B2 8/2011 Biewer et al.
8,130,836 B2 3/2012 Ha
8,212,921 B2 7/2012 Yun
8,218,812 B2 7/2012 Sugimoto et al.
8,242,974 B2 8/2012 Yamazaki et al.
8,350,799 B2 1/2013 Wasinger et al.
8,400,570 B2 3/2013 Dunn et al.
8,417,376 B1 4/2013 Smolen
8,441,574 B2 5/2013 Dunn et al.
8,605,121 B2 12/2013 Chu et al.
8,689,343 B2 4/2014 De Laet
8,704,752 B2 4/2014 Wasinger et al.
8,823,630 B2 9/2014 Roberts et al.
9,026,686 B2 5/2015 Dunn et al.
9,031,872 B1 5/2015 Foster
9,141,329 B1 * 9/2015 Reicher ................ G06F 3/1446
2001/0019454 A1 9/2001 Tadic-Galeb et al.
2002/0018522 A1 2/2002 Wiedenmann
2002/0026354 A1 2/2002 Shoji et al.
2002/0112026 A1 8/2002 Fridman et al.
2002/0118320 A1 8/2002 Bayrle et al.
2002/0120721 A1 8/2002 Eilers et al.
2002/0147648 A1 10/2002 Fadden et al.
2002/0154138 A1 10/2002 Wada et al.
2002/0163513 A1 11/2002 Tsuji
2002/0164962 A1 11/2002 Mankins et al.
2002/0190972 A1 12/2002 Ven de Van
2002/0194365 A1 12/2002 Jammes
2002/0194609 A1 12/2002 Tran
2003/0031128 A1 2/2003 Kim et al.
2003/0039312 A1 2/2003 Horowitz et al.
2003/0061316 A1 3/2003 Blair et al.
2003/0098881 A1 5/2003 Nolte et al.
2003/0117428 A1 6/2003 Li et al.
2003/0125892 A1 7/2003 Edge
2003/0161354 A1 8/2003 Bader et al.
2003/0177269 A1 9/2003 Robinson et al.
2003/0196208 A1 10/2003 Jacobson
2003/0202605 A1 10/2003 Hazra et al.
2003/0227428 A1 12/2003 Nose
2004/0012722 A1 1/2004 Alvarez
2004/0114041 A1 6/2004 Doyle et al.
2004/0138840 A1 7/2004 Wolfe
2004/0194131 A1 9/2004 Ellis et al.
2004/0207738 A1 10/2004 Wacker
2004/0252187 A1 12/2004 Alden
2005/0005302 A1 1/2005 Zigmond et al.
2005/0012734 A1 1/2005 Johnson et al.
2005/0046951 A1 3/2005 Sugihara et al.
2005/0071252 A1 3/2005 Henning et al.
2005/0123001 A1 6/2005 Craven et al.
2005/0127796 A1 6/2005 Olesen et al.
2005/0134525 A1 6/2005 Tanghe et al.

(56) References Cited

U.S. PATENT DOCUMENTS

2005/0134526 A1 6/2005 Willem et al.
2005/0184983 A1 8/2005 Brabander et al.
2005/0188402 A1 8/2005 de Andrade et al.
2005/0195330 A1 9/2005 Zacks et al.
2005/0216939 A1 9/2005 Corbin
2005/0253699 A1 11/2005 Madonia
2005/0289061 A1 12/2005 Kulakowski et al.
2005/0289588 A1 12/2005 Kinnear
2006/0087521 A1 4/2006 Chu et al.
2006/0150222 A1 7/2006 McCafferty et al.
2006/0160614 A1 7/2006 Walker et al.
2006/0214904 A1 9/2006 Kimura et al.
2006/0215044 A1 9/2006 Masuda et al.
2006/0244702 A1 11/2006 Yamazaki et al.
2007/0047808 A1 3/2007 Choe et al.
2007/0094620 A1 4/2007 Park
2007/0120763 A1 5/2007 De Paepe et al.
2007/0127569 A1 6/2007 Hatalker
2007/0152949 A1 7/2007 Sakai
2007/0157260 A1 7/2007 Walker
2007/0164932 A1 7/2007 Moon
2007/0165955 A1 7/2007 Hwang et al.
2007/0168539 A1 7/2007 Day
2007/0200513 A1 8/2007 Ha et al.
2007/0211179 A1 9/2007 Hector et al.
2007/0247594 A1 10/2007 Tanaka
2007/0274400 A1 11/2007 Murai et al.
2007/0286107 A1 12/2007 Singh et al.
2007/0297172 A1 12/2007 Furukawa et al.
2008/0008471 A1 1/2008 Dress
2008/0017422 A1 1/2008 Carro
2008/0018584 A1 1/2008 Park et al.
2008/0028059 A1 1/2008 Shin et al.
2008/0037783 A1 2/2008 Kim et al.
2008/0055247 A1 3/2008 Boillot
2008/0074372 A1 3/2008 Baba et al.
2008/0093443 A1 4/2008 Barcelou
2008/0104631 A1 5/2008 Krock et al.
2008/0106527 A1 5/2008 Cornish et al.
2008/0112601 A1 5/2008 Warp
2008/0119237 A1 5/2008 Kim
2008/0143637 A1 6/2008 Sunahara et al.
2008/0158468 A1* 7/2008 Kim .................... G02F 1/13336 349/58
2008/0163291 A1 7/2008 Fishman et al.
2008/0170028 A1 7/2008 Yoshida
2008/0174522 A1 7/2008 Cho et al.
2008/0201208 A1 8/2008 Tie et al.
2008/0231604 A1 9/2008 Peterson
2008/0232478 A1 9/2008 Teng et al.
2008/0246871 A1 10/2008 Kupper et al.
2008/0266331 A1 10/2008 Chen et al.
2008/0272999 A1 11/2008 Kurokawa et al.
2008/0278432 A1 11/2008 Ohshima
2008/0278455 A1 11/2008 Atkins et al.
2008/0291686 A1* 11/2008 Cull ...................... G02F 1/1336 362/471
2008/0303918 A1 12/2008 Keithley
2008/0313046 A1 12/2008 Denenburg et al.
2009/0036190 A1 2/2009 Brosnan et al.
2009/0058845 A1 3/2009 Fukuda et al.
2009/0102914 A1 4/2009 Collar et al.
2009/0102973 A1 4/2009 Harris
2009/0109165 A1* 4/2009 Park ..................... G09G 3/3426 345/102
2009/0128867 A1 5/2009 Edge
2009/0164615 A1 6/2009 Akkanen
2009/0182917 A1 7/2009 Kim
2009/0219295 A1 9/2009 Reijnaerts
2009/0251602 A1 10/2009 Williams et al.
2009/0254439 A1 10/2009 Dunn
2009/0260028 A1 10/2009 Dunn et al.
2009/0267866 A1 10/2009 Reddy et al.
2009/0273568 A1 11/2009 Milner
2009/0284457 A1 11/2009 Botzas et al.
2009/0289968 A1 11/2009 Yoshida
2009/0313125 A1 12/2009 Roh et al.
2009/0315867 A1 12/2009 Sakamoto et al.
2010/0039366 A1 2/2010 Hardy
2010/0039440 A1 2/2010 Tanaka et al.
2010/0039696 A1 2/2010 de Groot et al.
2010/0060550 A1 3/2010 McGinn et al.
2010/0083305 A1 4/2010 Acharya et al.
2010/0104003 A1 4/2010 Dunn et al.
2010/0109974 A1 5/2010 Dunn et al.
2010/0177157 A1 7/2010 Berlage
2010/0177158 A1 7/2010 Walter
2010/0188342 A1 7/2010 Dunn
2010/0194861 A1 8/2010 Hoppenstein
2010/0195865 A1 8/2010 Luff
2010/0198983 A1 8/2010 Monroe et al.
2010/0231563 A1 9/2010 Dunn et al.
2010/0238299 A1 9/2010 Dunn et al.
2010/0242081 A1 9/2010 Dunn et al.
2010/0253613 A1 10/2010 Dunn et al.
2010/0253778 A1 10/2010 Lee et al.
2011/0012856 A1 1/2011 Maxwell et al.
2011/0047567 A1 2/2011 Zigmond et al.
2011/0069018 A1 3/2011 Atkins et al.
2011/0074803 A1 3/2011 Kerofsky
2011/0078536 A1 3/2011 Han et al.
2011/0102630 A1 5/2011 Rukes
2011/0181693 A1 7/2011 Lee et al.
2011/0225859 A1 9/2011 Safavi
2011/0273482 A1 11/2011 Massart et al.
2012/0075362 A1 3/2012 Ichioka et al.
2012/0182278 A1 7/2012 Ballestad
2012/0188262 A1 7/2012 Rabii
2012/0203872 A1 8/2012 Luby et al.
2012/0268350 A1* 10/2012 Yoshimura ........... G09G 3/3426 345/1.3
2012/0302343 A1 11/2012 Hurst et al.
2013/0110565 A1 5/2013 Means, Jr. et al.
2013/0162908 A1 6/2013 Son et al.
2014/0043302 A1 2/2014 Barnes
2014/0139116 A1 5/2014 Reed
2014/0160365 A1* 6/2014 Kwong ................. G02F 1/1336 349/12
2014/0240201 A1* 8/2014 Takahashi ............. G06F 3/1446 345/1.3
2014/0246982 A1* 9/2014 Araki ................... G09G 3/3406 315/151
2014/0333541 A1 11/2014 Lee et al.
2014/0361969 A1* 12/2014 Wasinger ............. G09G 3/3413 345/102
2014/0375704 A1 12/2014 Bi et al.
2015/0070340 A1 3/2015 Trachtenberg et al.
2015/0312488 A1 10/2015 Kostrzewa et al.
2016/0014103 A1 1/2016 Masters et al.
2016/0034240 A1 2/2016 Kreiner et al.
2016/0063954 A1 3/2016 Ryu
2016/0125777 A1 5/2016 Knepper et al.
2016/0293206 A1 10/2016 Dunn
2016/0300549 A1* 10/2016 Zhang .................... G09G 5/006
2016/0335705 A1 11/2016 Williams et al.
2016/0358357 A1 12/2016 Dunn et al.
2017/0111486 A1 4/2017 Bowers et al.

FOREIGN PATENT DOCUMENTS

CN 102246196 A 11/2011
EP 0313331 A2 4/1989
EP 1640337 A2 3/2006
EP 2332120 A2 6/2011
EP 2401736 A2 1/2012
EP 2401869 A2 1/2012
ID 0514488 A 9/2011
JP 2002064842 A 2/2002
JP 2002209230 A 7/2002
JP 2002366121 A 12/2002
JP 2005236469 A 9/2005
JP 2006184859 A 7/2006
JP 2008034841 A 2/2008

(56) References Cited

FOREIGN PATENT DOCUMENTS

| | | | |
|---|---|---|---|
| JP | 2008165055 | A | 7/2008 |
| JP | 2009009422 | A | 1/2009 |
| KR | 20000021499 | A | 4/2000 |
| KR | 20020072633 | A | 9/2002 |
| TW | 200403940 | A | 3/2004 |
| WO | WO9608892 | A1 | 3/1996 |
| WO | WO2006089556 | A1 | 8/2006 |
| WO | WO2006111689 | A1 | 10/2006 |
| WO | WO2009004574 | A1 | 1/2009 |
| WO | WO2010037104 | A2 | 4/2010 |
| WO | WO2010085783 | A1 | 7/2010 |
| WO | WO2010085784 | A2 | 7/2010 |
| WO | WO2010094039 | A2 | 8/2010 |
| WO | WO2010099178 | A2 | 9/2010 |
| WO | WO2010099194 | A2 | 9/2010 |
| WO | WO2011026186 | A1 | 3/2011 |
| WO | WO2011035370 | A1 | 3/2011 |
| WO | WO2011044640 | A1 | 4/2011 |
| WO | WO2011060487 | A1 | 5/2011 |
| WO | WO2011143720 | A1 | 11/2011 |
| WO | WO2016000546 | A1 | 1/2016 |

OTHER PUBLICATIONS

Analog Devices, ADV212: JPEG 2000 Video Codec, http://www.analog.com/en/audiovideo-products/video-compression/ADV212/products/pr..., accessed Oct. 15, 2008, 2 pages.

Analog Devices, Inc., JPEG 2000 Video Codec ADV212, 2006, 44 pages.

Photo Research, Inc., PR-650 SpectraScan Colorimeter, 1999, 2 pages.

Teravision Corp, LCD-TV Panel Control Board Specification, Nov. 2007, 24 pages.

Texas Advanced Optoelectronic Solutions Inc., TCS230 Programmable Color Light-To-Frequency Converter, Dec. 2007, 12 pages.

Texas Advanced Optoelectronic Solutions Inc., TCS3404CS, TCS3414CS Digital Color Light Sensors, Feb. 2009, 38 pages.

Wikipedia, Color rendering index, https://en.wikipedia.org/wiki/Color_rendering_index, accessed Aug. 25, 2016, 13 pages.

Wikipedia, Gamut, https://en.wikipedia.org/wiki/Gamut, accessed Aug. 25, 2016, 8 pages.

Wikipedia, Gradient-index optics, https://en.wikipedia.org/wiki/Gradient-index_optics, accessed Aug. 25, 2016, 5 pages.

* cited by examiner

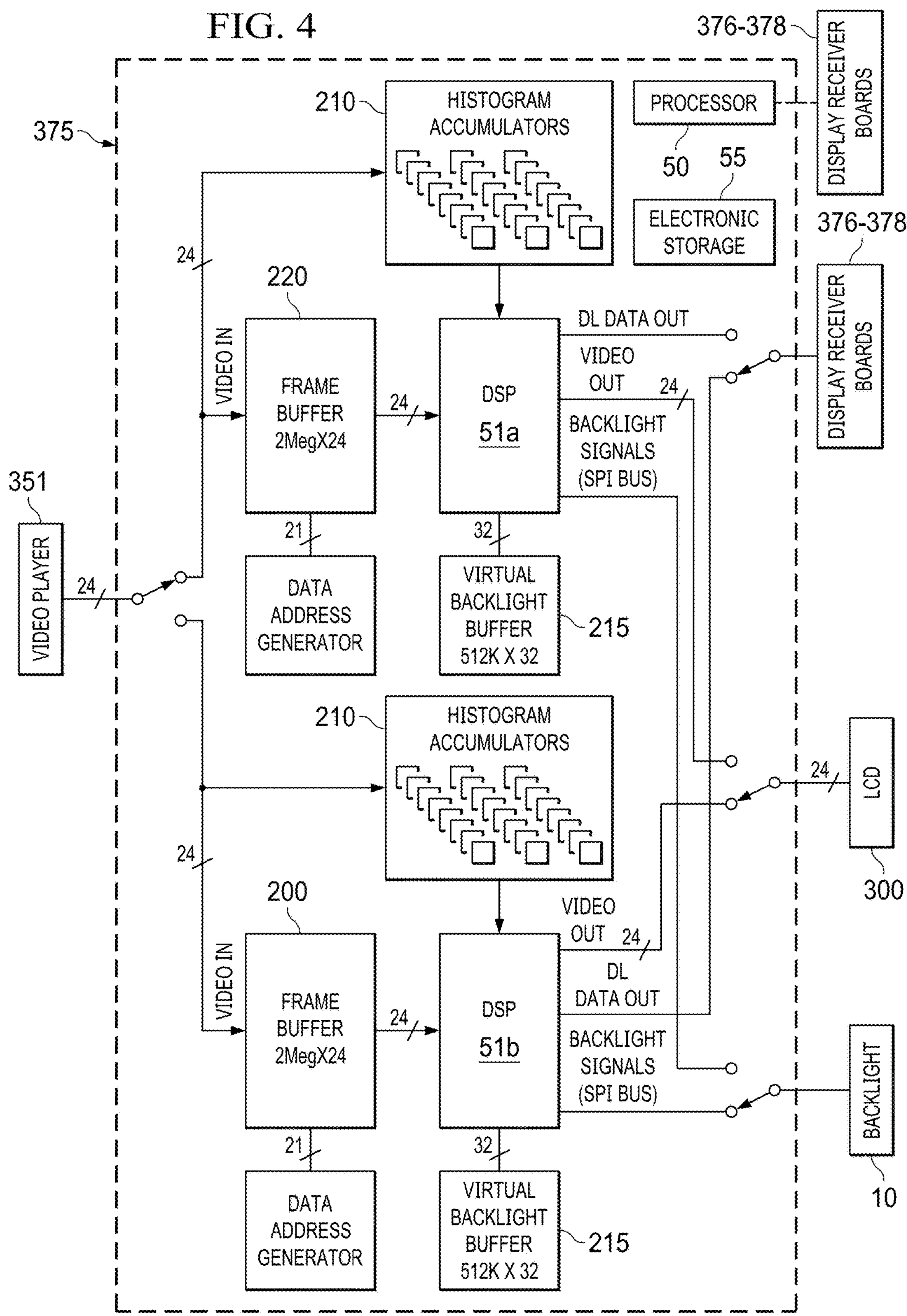
FIG. 4
375
376-378
DISPLAY RECEIVER BOARDS
210
HISTOGRAM ACCUMULATORS
PROCESSOR
50
55
ELECTRONIC STORAGE
376-378
DISPLAY RECEIVER BOARDS
24
220
VIDEO IN
FRAME BUFFER 2MegX24
24
DSP
51a
DL DATA OUT
VIDEO OUT
24
BACKLIGHT SIGNALS (SPI BUS)
351
VIDEO PLAYER
24
21
32
DATA ADDRESS GENERATOR
VIRTUAL BACKLIGHT BUFFER 512K X 32
215
210
HISTOGRAM ACCUMULATORS
24
LCD
300
200
VIDEO IN
FRAME BUFFER 2MegX24
24
DSP
51b
VIDEO OUT
24
DL DATA OUT
BACKLIGHT SIGNALS (SPI BUS)
BACKLIGHT
10
21
32
DATA ADDRESS GENERATOR
VIRTUAL BACKLIGHT BUFFER 512K X 32
215

DYNAMIC DIMMING LED BACKLIGHT FOR LCD ARRAY

CROSS-REFERENCE TO RELATED APPLICATIONS

This application claims the benefit of U.S. Provisional Application No. 62/373,238, filed on Aug. 10, 2016, which is hereby incorporated by reference as if fully recited herein.

TECHNICAL FIELD

Disclosed embodiments relate generally to an LED backlight having individually controlled subsections and an associated array of individual liquid crystal displays.

BACKGROUND

Liquid Crystal Displays (LCDs) contain several layers which work in combination to create a viewable image. A backlight is used to generate the rays of light that pass through what is commonly referred to as the LCD stack, which typically contains several layers that perform either basic or enhanced functions. The most fundamental layer within the LCD stack is the liquid crystal material, which may be actively configured in response to an applied voltage in order to pass or block a certain amount of light which is originating from the backlight.

The light passing through each subpixel originates as “white” (or broadband) light from the backlight, although in general this light is far from being uniform across the visible spectrum. Subpixel color filters allow each subpixel to transmit a certain amount of each of several colors (e.g., red, green, blue, etc). When viewed from a distance, the subpixels appear as one composite pixel and by electrically controlling the amount of light that passes for each subpixel color, the composite pixel can produce a very wide range of different colors due to the effective mixing of light from the colored subpixels.

LCDs are becoming popular for not only home entertainment purposes, but are now being used as informational/advertising displays in both indoor and outdoor locations. When used for information/advertising purposes, the displays may remain ‘on’ for extended periods of time and thus would see much more use than a traditional home use. Further, when displays are used in areas where the ambient light level is fairly high (especially outdoors) the displays must be very bright in order to maintain adequate picture brightness. When used for extended periods of time and/or outdoors, overall energy consumption can become an issue. Thus, it is desirable to limit the power consumption of these displays as much as possible while maintaining image fidelity.

Further, arrays of LCD displays are now being used to provide very large video displays. Dynamic dimming backlights are sometimes used with these LCD displays, but this presents a number of issues when images are blended across the array of LCD displays having dynamic dimming backlights.

SUMMARY

Exemplary embodiments provide a system and method for controlling a dynamic dimming backlight when placed behind and array of LCD displays.

These and other objects are achieved as described in the following detailed description.

BRIEF DESCRIPTION OF THE DRAWINGS

A better understanding of the general inventive concept may be gained through a reading of the following detailed description and the accompanying drawings, wherein identical reference characters refer to identical parts and where:

FIG. 4 is an electrical block diagram for one embodiment of a display receiver board and various associated components;

DETAILED DESCRIPTION OF EXEMPLARY EMBODIMENTS

Figure 1:
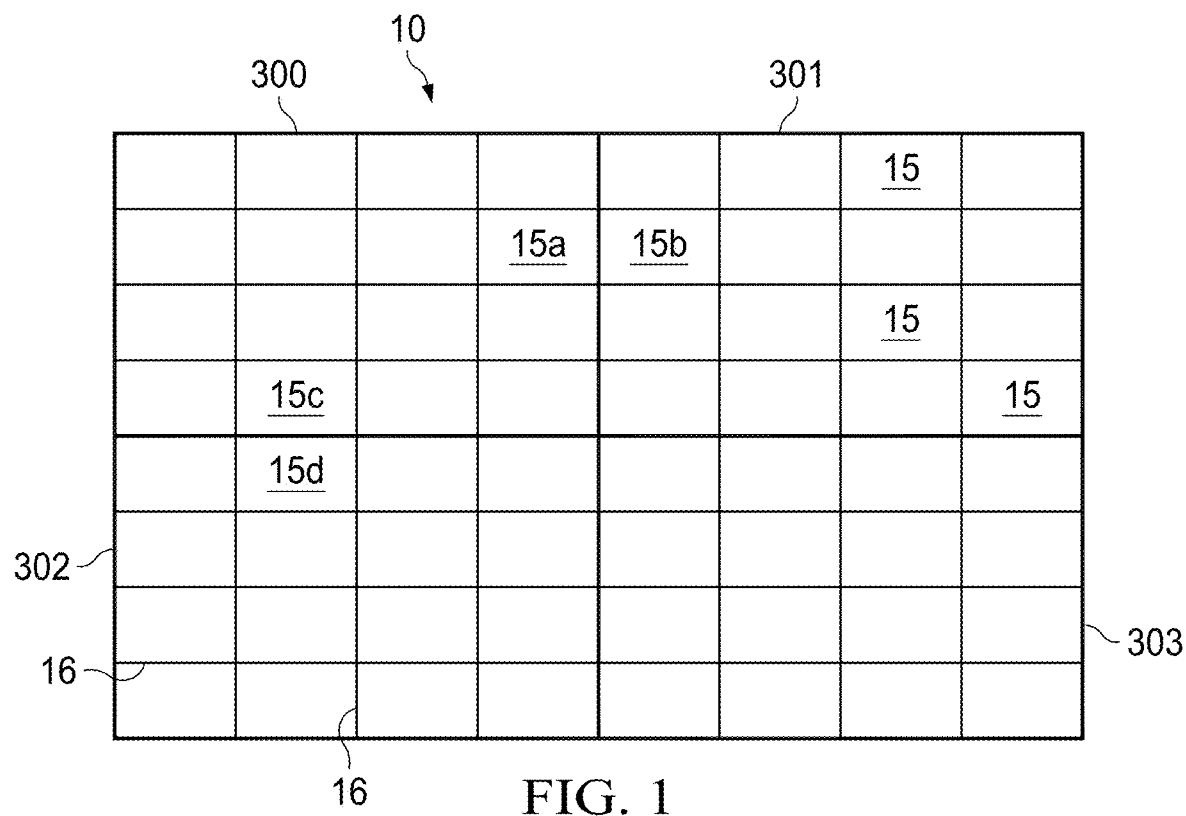
FIG. 1 is a front view of an exemplary dynamic backlight with individually controlled subsections and a plurality of individual LCD displays positioned in front of the backlight, and is shown as transparent to illustrate the alignment of the LCD displays with the backlight.

The general inventive concept is described more fully hereinafter with reference to the accompanying drawings, in which exemplary embodiments are shown. The inventive concept may, however, be embodied in many different forms and should not be construed as limited to the exemplary embodiments set forth herein. Rather, the exemplary embodiments are provided for purposes of illustration, not limitation. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections are not to be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one or more other features, integers, steps, operations, elements, components, and/or groups thereof.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a front view of an exemplary backlight with individually controlled subsections 15, and a plurality of individual LCD displays 300-303 positioned in front of the backlight 10 and shown as transparent to illustrate the alignment of the LCD displays 300-303 with the backlight 10. The backlight 10 produces light through a plurality of LEDs (not shown due to the scale of the figure) which are mounted to the front face of the backlight 10. In this example, an 8×8 array of subsections 15 is shown. However, any number, shape, and size of subsections may be used with the various embodiments. The number of actual subsections may depend upon: the size of the display, cost, complexity of controlling circuitry desired, and desire for maximum power savings. Ideally, a greater number of subsections will provide a higher level of system control and performance. It should be noted that the lines 16 are used only to represent the divisions regarding control of the subsections 15, and are not indicative of actual lines or physical divisions of the backlight 10.

In this embodiment, four individual LCD displays 300-303 are positioned in front of the backlight 10. Again it should be noted that the exemplary embodiments herein do not require any particular number of LCD displays nor any particular orientation of the LCD displays (shown here in landscape orientation). Of particular note here is the presence of subsection 15*a* positioned behind the boundary edge of LCD 300, which is adjacent to subsection 15*b* positioned behind the boundary edge of LCD 301. These may be referred to herein as a subsection pair which lies across the LCD boundary between LCD 300 and LCD 301. Also note subsection 15*c* positioned behind the boundary edge of LCD 300, which is adjacent to subsection 15*d* positioned behind the boundary edge of LCD 302. These may be referred to herein as a subsection pair which lies across the LCD boundary between LCD 300 and LCD 302.

Figure 2:
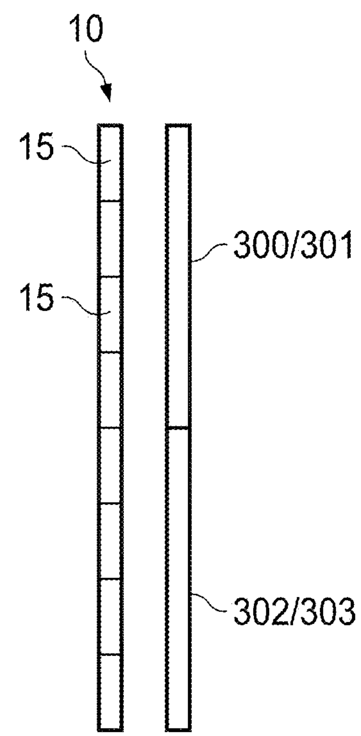
FIG. 2 is a side view of the backlight embodiment shown in FIG. 1.

FIG. 2 is a side view of the embodiment shown in FIG. 1.

Figure 3:
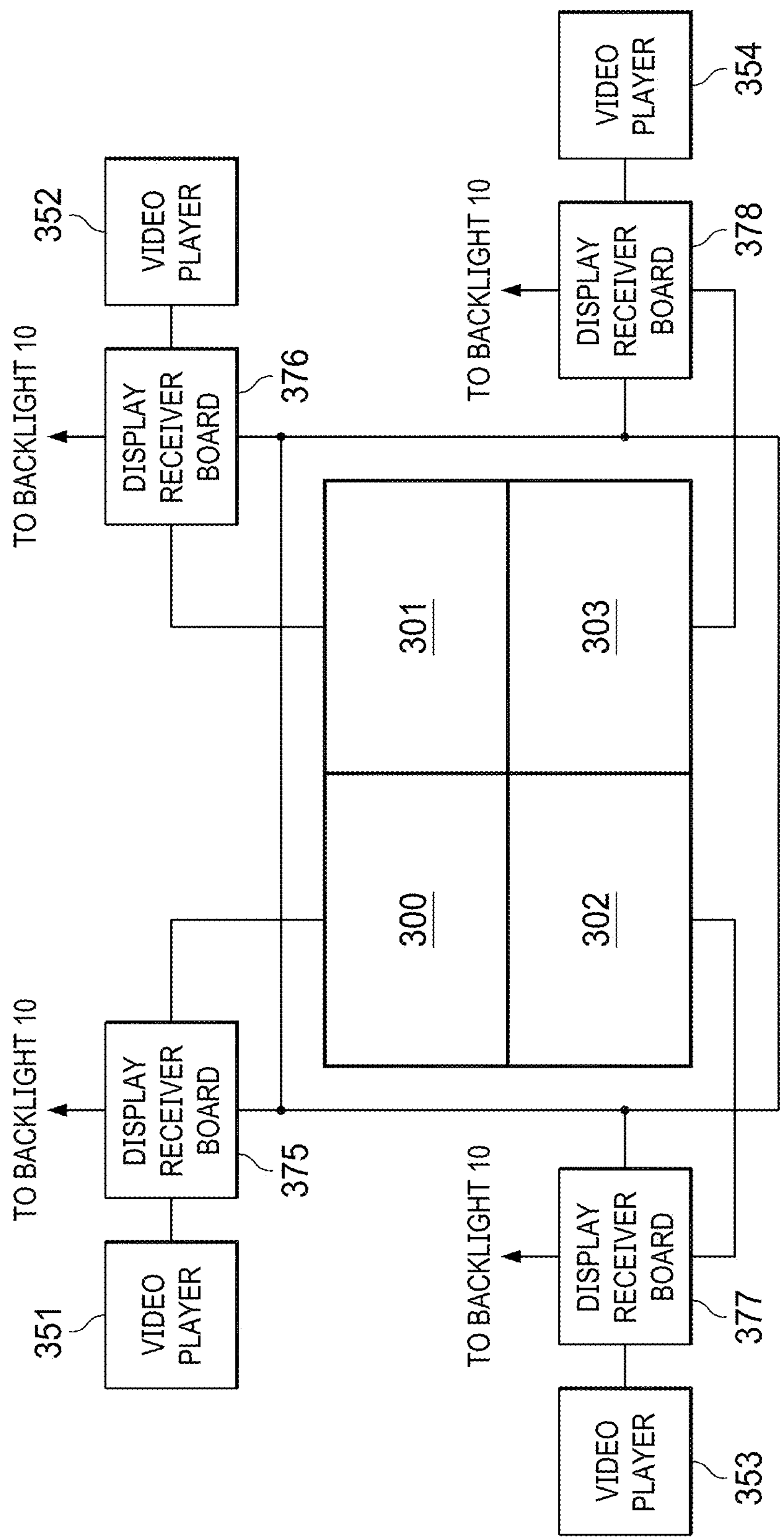
FIG. 3 is a schematic view of one physical architecture embodiment for controlling the exemplary dynamic backlight, as well as multiple video players.

FIG. 3 is a schematic view of one exemplary physical architecture embodiment for controlling the dynamic backlight of FIGS. 1-1, as well as multiple video players. Here, each LCD display 300-303 is preferably in respective electrical connection with a corresponding display receiver board 375-378. Each display receiver board 375-378 is also preferably in respective electrical connection with a corresponding video player 351-354, as well as with the backlight 10. Finally, each display receiver board 375-378 also preferably communicates electrically in some manner with the other display receiver boards 375-378 so that information about the desired luminance of backlight sections can be shared across the various display receiver boards 375-378. In some embodiments, each display receiver board may be in electrical communication with only the other display receiver boards that drive the two adjacent LCDs, but not with the display receiver board that drives the remaining LCD. For example, the display receiver board 375 may only share backlight data (and be in electrical connection with) the display receiver boards 376 and 377.

FIG. 4 is an electrical block diagram for one exemplary embodiment of a display receiver board, along with various associated components. It should be noted that this is simply an example of receiver board design, as the specific components used would be based on the specific technique (see below) employed to determine the desired luminance (DL) level for each backlight subsection. However, this is not required if one of skill in the art does not practice the specific technique below regarding how to determine DL for each backlight subsection.

This specific example assumes the following but none of this is required for an exemplary embodiment: the input is RGB data on a 24-bit wide data bus, an 8×8 backlight array is used, the output is RGB data on a 24-bit wide data bus, an external pixel clock is available, the maximum LCD resolution is 1080 by 1920 for a total of 2,073,600 pixels, the Samsung LTI700HD01 is the assumed LCD, and the design should support a pixel clock of 148.5 Mhz. The following provides a description of only an exemplary display receiver board 375, and it should be recognized that display receiver boards 376-378 would each contain similar components, again depending on what technique is used to determine DL.

A video player 351 may generate content for the LCD display 300 and preferably outputs a corresponding series of video frames. Two frame buffers 200 may be used to combine the data from the video player 351 as well as to preferably store, process, and output the frames of video. In some embodiments, each frame buffer may store 2,073,600 RGB values and the width of the frame buffer may be at least 24 bits. Eight, three channel histogram accumulators 210 may be used for statistical processing. Each accumulator 210 may consist of 256 15-bit counters. There may be accumulators for each of the three color channels (if using an RGB-type LCD). The output of each counter may be double buffered. Two virtual backlight buffers 215 may be used to store newly created backlight DL levels based on incoming image data and to rescale the gain of outgoing LCD data.

Figure 9:
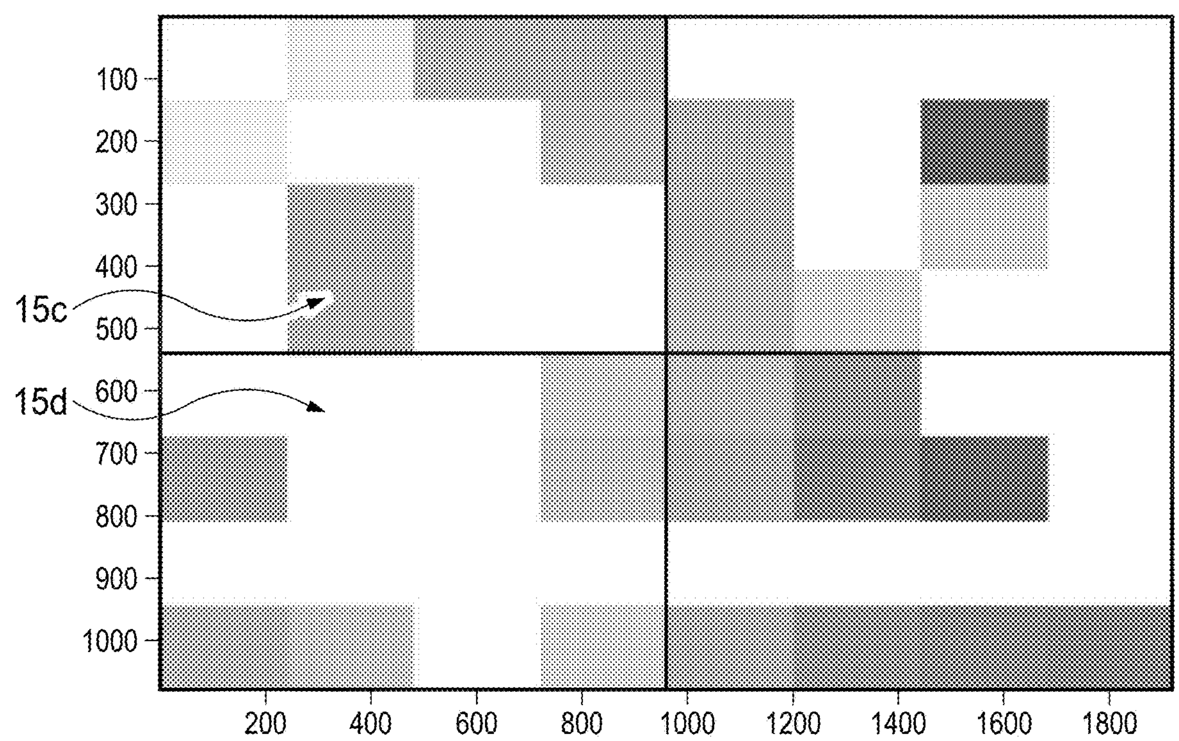
FIG. 9 is a front view of the exemplary backlight of FIG. 1, where each subsection is being driven at the appropriate luminance level based on the histogram data for the corresponding sub-image.

The exemplary architecture of FIG. 9 would preferably implement the DL level determination steps using a "Pitch and Catch" approach. That is, while one block is 'catching' and analyzing the incoming video data, the other block is scaling and 'pitching' video data to the output. In some cases this approach requires two sets of physical components, while in other embodiments it can be accomplished with a single set of physical components. As shown in FIG. 4, the upper half of the exemplary display receiver board is in "catch" mode. During this phase, incoming RGB data is sampled by the histogram accumulators 210 while being stored in the frame buffer 200. After the lines have been buffered, the contents of the histogram accumulators 210 are made available to the digital signal processor 51 (DSP) and, optionally, to an additional processor 50. The DSP 51 then calculates the DL for each of the corresponding backlight subsections and updates the virtual backlight buffer 215 (if necessary). This process may be repeated several more times for the remaining video data. Note that the last eight subsections placed into the virtual backlight buffer may have to be calculated during the "vertical retrace" period, depending on processing speed and the particular setup.

The lower half of the display receiver board is operating in "pitch" mode. During this phase, each pixel from the frame buffer 200 is preferably divided by the corresponding pixel in the virtual backlight buffer 215 and sent to the video out MUX. To speed execution and avoid the use of a hardware divider, a lookup table may be used to determine a scaling factor. This factor can then be used to rescale the RGB data with three 8×8 multipliers. Concurrent with the rescaling operation, the individual subsections of the backlight matrix may be updated synchronously using the values calculated during the "catch" phase.

The DSP 51 is preferably in electrical connection with some or all of the remaining display receiver boards 376-378 in order to share the DL data for adjacent backlight subsections which lie across an LCD boundary. In some embodiments, the DSP 51 may be the only processor on the display receiver board, while in other embodiments the additional processor 50 may be used to perform any of the logic shown or described herein. Thus, in some embodiments it would not be the DSP 51 that is in electrical connection with the remaining display receiver boards 376-378 but, rather, the additional processor 50 would be in electrical connection with the remaining display receiver boards 376-378. Also, additional electronic storage 55 may be used in some display receiver board embodiments.

It should be noted that although shown with a DSP 51, as well as an optional processor 50, the embodiments herein may also be practiced with equivalents thereof, including but not limited to one or more field-programmable gate arrays (FPGA).

Figure 5:
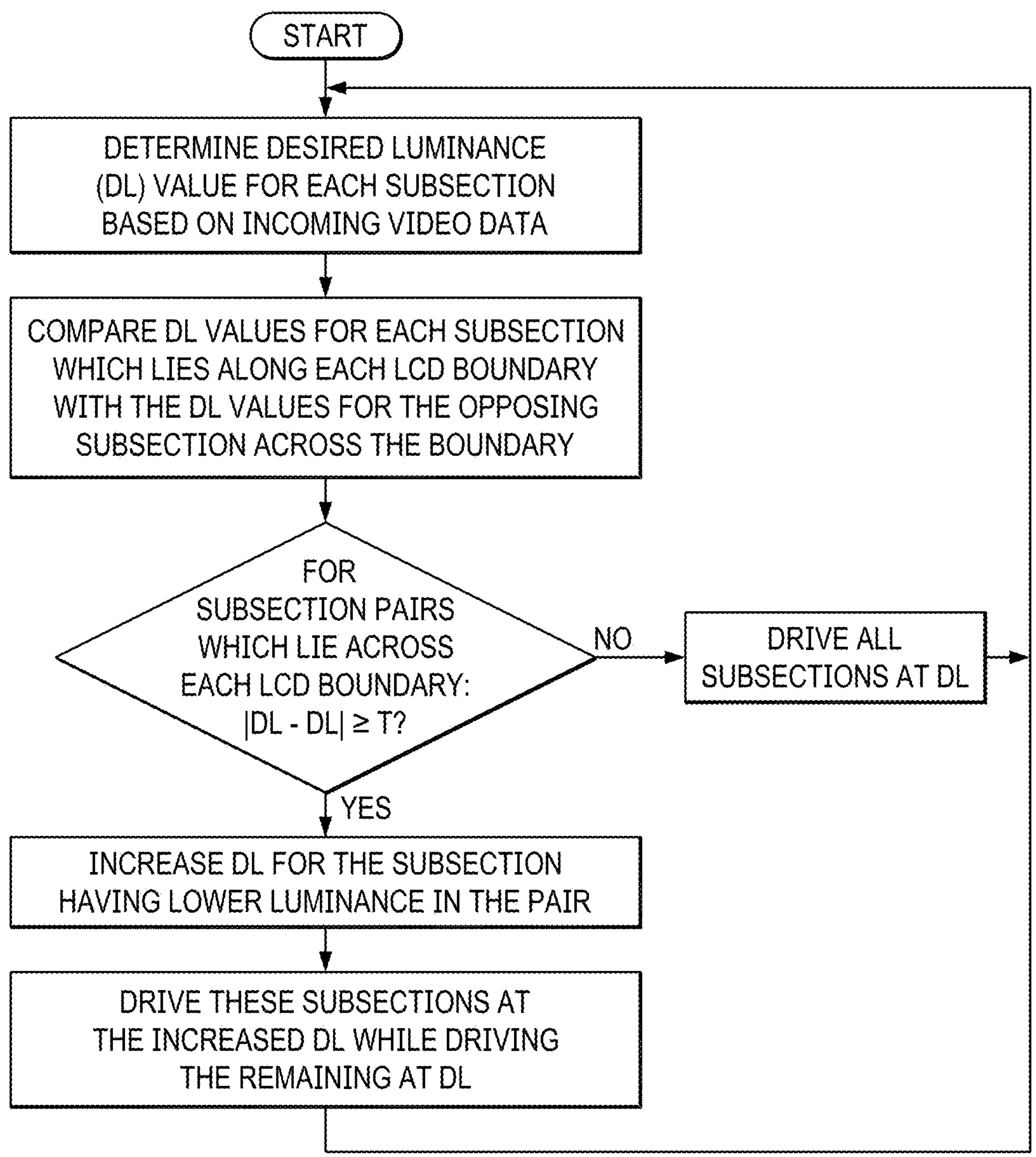
FIG. 5 is a logic flowchart for operating any one of the embodiments disclosed herein.

FIG. 5 is a logic flowchart for operating any one of the embodiments disclosed herein. Initially, the system accepts incoming video data and determines the DL for each backlight subsection. As noted above, there are many techniques for analyzing the video data and determining DL for each backlight subsection. The figures which follow illustrate one exemplary method for determining DL but it should be noted that there are many other methods available, and any one of said methods could be practiced with the exemplary embodiments herein.

Next, the system preferably compares the DL values for adjacent subsections which lie along the LCD boundary lines. In other words, the DL value for each subsection which lies along each LCD boundary line is compared with the DL value for the opposing subsection which lies across the boundary line. For example, the DL values for subsection 15*a* would be compared with subsection 15*b*, while the DL values for 15c would be compared with subsection 15*d*. A threshold (T) value may be chosen to represent the maximum allowable difference between two adjacent subsections that lie across the LCD boundary line. As an example, the luminance values for the backlight subsections can range from 0 (off) to 255 (max luminance), so T could be set at any value between 0 and 255. Every application may be different, thus T may vary depending on the specific application. Generally, however, T should be between 50 and 240 (or 20%-95% of the scale of DL values). An exemplary embodiment may set T equal to 223 (when using 0-255 as the range for DL) or approximately 87% of the scale of DL values.

If the difference between the two adjacent subsections that lie across the LCD boundary is equal to or larger than T, then the DL for the subsection having a lower luminance is preferably increased. This luminance increasing step may be performed in a number of ways. First, a constant value may be added to the luminance level of the subsection having a lower luminance and could, for example, be set at 10%-40% of T (i.e., 22-89 if using the 0-255 range). In an exemplary embodiment, the added value may be approximately 32. Alternatively, a look up table may be used with results that vary depending on the magnitude of the difference between the two DL values. For example, if the difference between the two DL values is large, then a larger value is added to the luminance level of the subsection having a lower DL. The amount added can be gradually decreased as the difference between the two DL values decreases, eventually going to zero.

Still alternatively, a mathematical operation may be performed to calculate the amount to add to the luminance level of the subsection having a lower DL. In some embodiments this may be a percentage or fractional operation where a fractional value is applied to the difference between the two values for DL in order to determine the amount to be added. For example, some embodiments may calculate the amount to be added by multiplying the difference between the two values for DL by one-half or one-third. Of course, any number of linear or non-linear functions could also be used where these functions would accept the two values for DL (or just the difference) and would calculate the amount to be added to the lower DL value based on these functions.

The system then drives the lower luminance subsection at the increased DL level while driving the remaining subsections at the DL level. If the system determines that no subsection pairs have a difference in DL values that is greater than T, then the system would simply return to the next video frame to analyze and determine the DL level for each subsection for the next frame.

One exemplary method for determining the DL level for each subsection of the dynamic backlight is presented below. As noted above, there are many different methods for determining DL for the backlight subsections and no specific method is required to be used.

Figure 6:
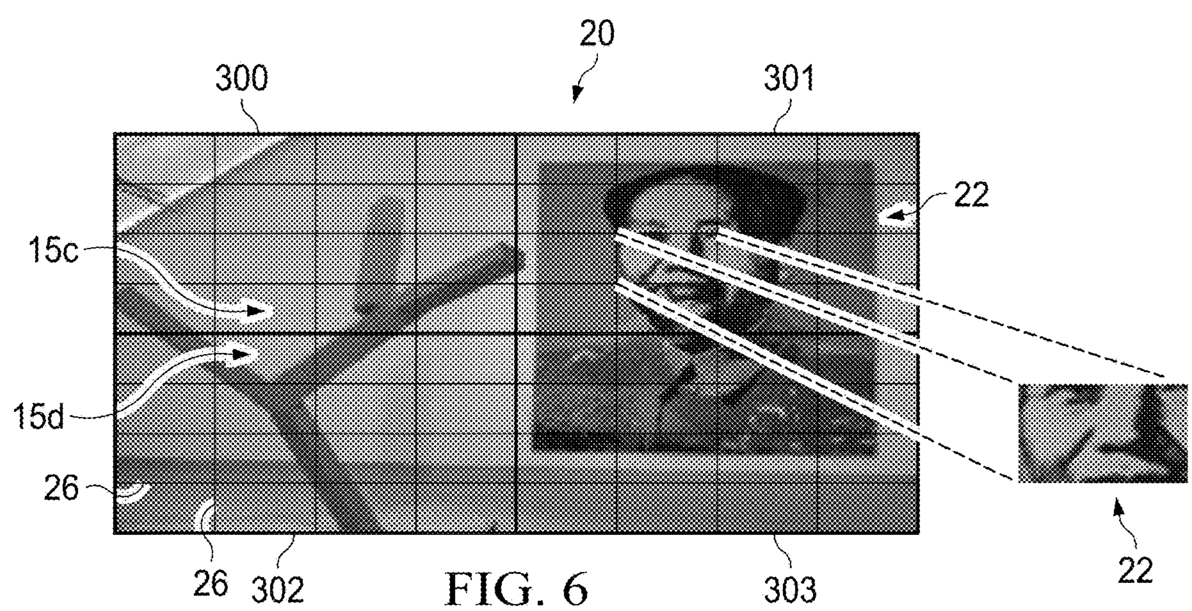
FIG. 6 illustrates exemplary LCD image data.

FIG. 6 illustrates exemplary LCD image data 20, where the illustrated image is divided into theoretical sub-images 22 that preferably correspond with the subsections 15 of the backlight 10 (as indicated in FIG. 1). Again, the lines 26 are only used to represent the theoretical divisions of the sub-images, and are not physical divisions of the LCD nor visible through the LCD assembly.

Figure 7:
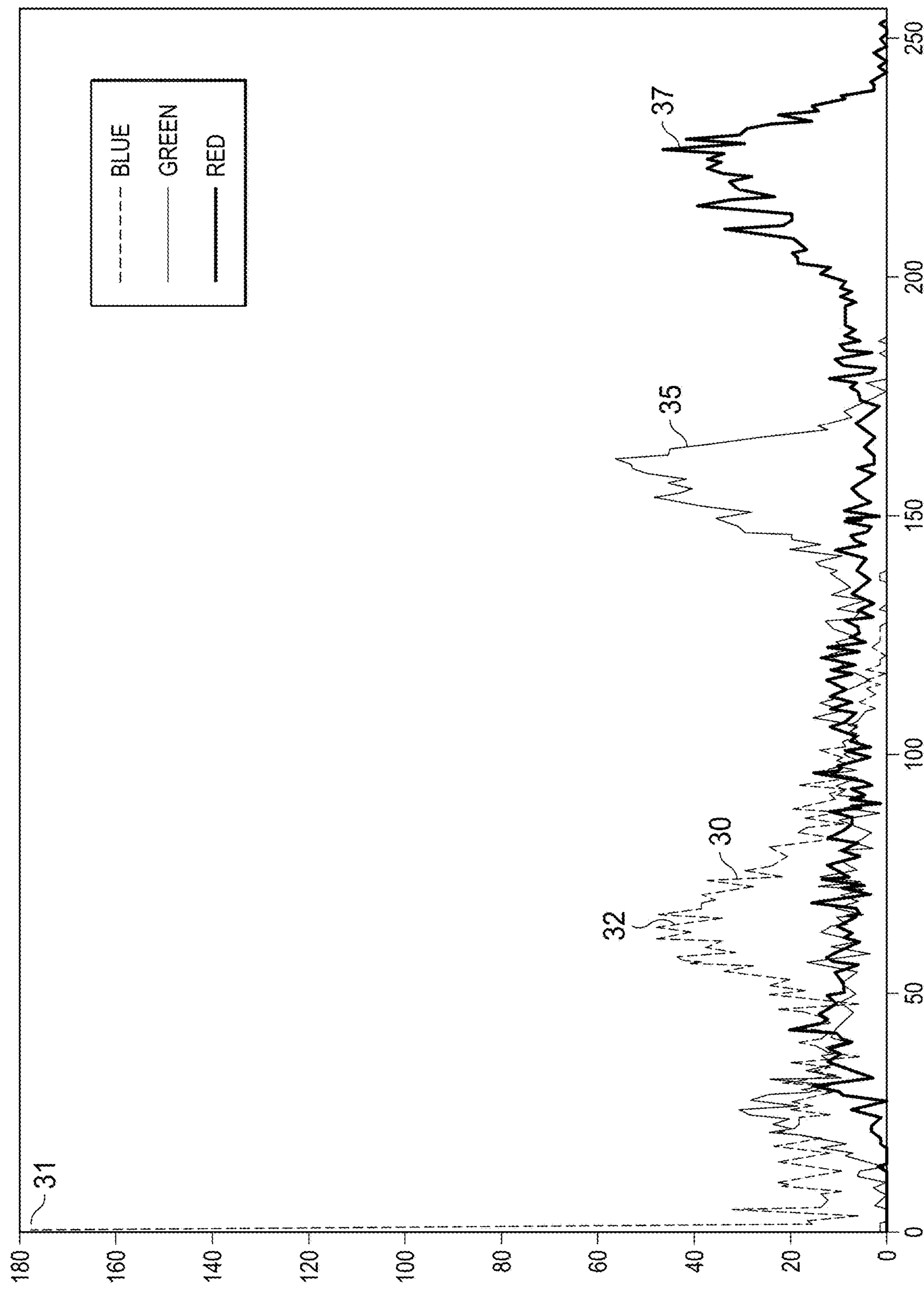
FIG. 7 is a histogram of a sub-image.

FIG. 7 shows a plot of histogram data for one of the sub-images 22 shown in FIG. 6. The brightness index value is shown along the x-axis and the number of pixels within the sub-image that have the corresponding brightness index value is shown along the y-axis. Here, the brightness index values range from 0 (no saturation) to 255 (fully saturated). Three separate plots are shown in FIG. 7: red subpixels 37, blue subpixels 30, and green subpixels 35. It can be observed from this plot that the red subpixels will control the brightness requirements for this subsection of the backlight, as the red subpixel histogram data is skewed to the right of the green subpixel data 35 and blue subpixel data 30. Further, it can also be observed that the blue subpixel data 30 is bimodal, meaning that there are two peaks in the data—a first peak 31 near zero and a second peak 32 near 60. This bimodal characteristic will be discussed further below.

Figure 8:
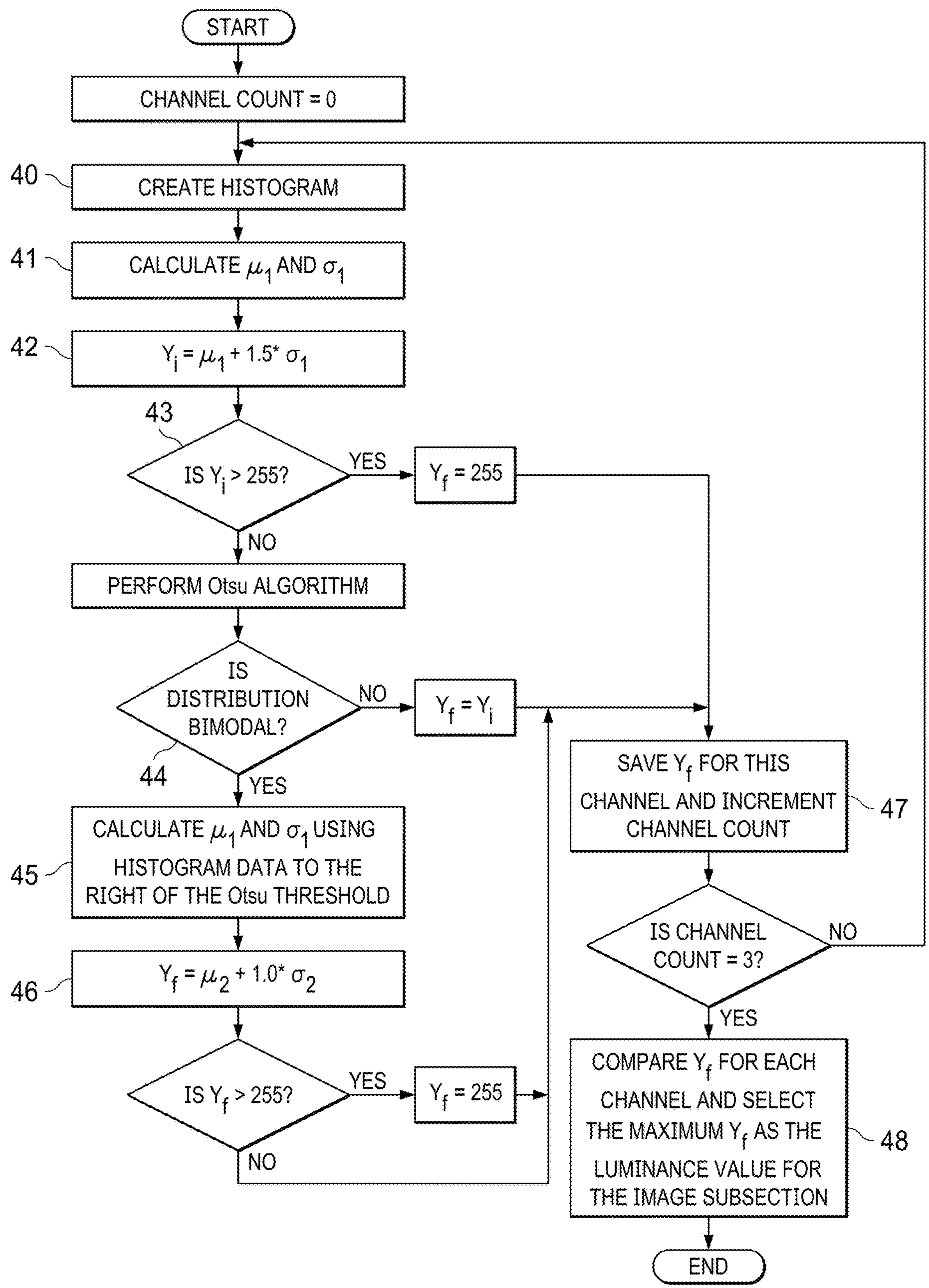
FIG. 8 is a flow chart setting forth one exemplary method for analyzing the sub-image histogram data.

The histogram data for each sub-image may be analyzed to determine the proper luminance level for the backlight subsection corresponding to each sub-image. FIG. 8 represents one exemplary technique for analyzing the histogram data for each channel (in this example: red, green, and blue) to determine the proper luminance setting for the backlight subsection.

Once the histogram data has been created 40, a first average $\mu_1$ and standard deviation $\alpha_1$ are calculated 41. The following is one method for calculating these values and analyzing them:

Let N=the total number of pixels (red, green, or blue) in the subimage.

Denote the histogram as H(i) where i ranges from 0 to 255

Calculate the average from:

$$\mu_1 = \frac{1}{N}\sum_{i=0}^{255} i \cdot H(i)$$

Calculate Standard Deviation $$\sigma_1 = \sqrt{\frac{1}{N}\left(\sum_{i=0}^{255} H(i) \cdot i^2\right) - \mu_1^2}$$

The initial luminance value for this subsection of the backlight may then be calculated 42 as the average value plus one and a half standard deviations. $Y=\mu_1+1.5\cdot\sigma_1$. It should be noted that one and a half standard deviations was chosen as effective for one embodiment. Depending on several factors, some systems may require more or less than 1.5 standard deviations for adequate system performance. This variable could be adjusted for each display.

The backlight luminance can range from 'off' to 'full on' and these points, along with all of the settings in between, should be calibrated with the brightness index values from the histogram, which can also vary from 0 (off) to 255 (full on). Thus, once the initial luminance value is calculated it may be compared with the maximum value of 255 (see step 43). If the calculated initial luminance value is greater than 255, then the backlight luminance for this subsection is simply set to full on (255) and is stored for this channel (go directly from step 43 to step 47). The use of 'channel' herein denotes one of the primary colors that are used to create the image within the LCD. As discussed above, a typical LCD contains three channels (Red, Green, and Blue) but other LCD designs may use additional colors (such as Yellow) and thus may contain 4 or more channels.

Next, the histogram data for this channel may be tested for a bimodal distribution 44. This step may be performed because if the distribution contains multiple peaks, simply averaging and adding some amount of standard deviations may completely miss a peak which would require a higher backlight level. For example, in reference to FIG. 7, as mentioned above, the blue curve 30 may be considered bimodal. The initial luminance $Y_i$ for the blue subpixel curve 30 may fall somewhere in between peak 31 and peak 32, thus missing the peak 32 that requires the highest amount of backlight (i.e., if the blue subpixel curve were driving the backlight level, the minimum luminance level would have to be closer to 70, to ensure that the second peak 32 of the blue subpixel curve achieves its necessary illumination). In this particular example, such a $Y_i$ value would not affect the outcome of the analysis because the highest luminance value between the three channels is the value that will be finally used for the subsection (see step 48 in FIG. 8). Nonetheless, the test for bimodal distribution may still be performed to ensure that the driving color (the Red channel in this case) does not contain several peaks such that one would not be adequately illuminated.

The following is one method for determining if a histogram is bimodal 44. Using Otsu's algorithm, find the optimal separation point between distributions in the histogram:

C=nB(T)nO(T)[μB(T)−μO(T)] (Otsu's algorithm)

where:

T is the threshold value and ranges from 0 to 255 nB(T) is the number of pixels that fall below the threshold value nO(T) is the number of pixels that fall above the threshold value μB(T) is the average value of the pixels below the threshold value μO(T) is the average value of the pixels above the threshold value Perform Otsu's algorithm for each value of T in the histogram and determine the T that corresponds to the maximum value of C (this will be referred to as $T_{max}$, also known as the Otsu Threshold).

Compare $T_{max}$ to the first average value $\mu_1$.

If, $|T_{max}-\mu_1|\leq\Delta$, then the histogram data is not bimodal and the luminance value for the subsection is equal to the initial luminance value (i.e., $Y_f=Y_i$).

Note, Δ may be selected for each display setup and may need to be adjusted depending on the type of display and what is being shown on the display. Acceptable results have been found for some displays with a Δ value near 10.

If, $|T_{max}-\mu_1|>\Delta$, then the histogram data is bimodal and the following steps should be performed:

Calculate a second average and a second standard deviation based on the histogram data to the right of $T_{max}$ (see step 45 in FIG. 4).

Set $j=T_{max}$ $$N = \sum_{i=j+1}^{255} H(i)$$

// Set N to new sample size

Calculate the Second average from:

$$\mu_2 = \frac{1}{N}\sum_{i=j+1}^{255} i \cdot H(i)$$

Calculate the Second Standard Deviation from:

$$\sigma_2 = \sqrt{\frac{1}{N}\left(\sum_{i=j+1}^{255} H(i)\cdot i^2\right) - \mu_2^2}$$

The final luminance value ($Y_f$) for this channel can then be calculated 46 as the average plus one standard deviation (i.e., $Y_f=\mu_2+1.0\cdot\sigma_2$). Again, acceptable results have been found by using one standard deviation, but different display setups may require a different number of standard deviations. This final luminance value should be compared to the maximum luminance value possible (255) and if it is larger than this value, the luminance value will simply be stored as the maximum luminance of 255 (i.e., if $Y_f>255$ then $Y_f=255$). The final luminance value for this channel is then stored 47 and steps 40-47 are repeated for the remaining two (or more) channels. Finally, when the final luminance value for all three channels (R, G, and B) has been determined, the values are compared with one another and the largest final luminance value $Y_f$ is stored 48 as the proper luminance value for the given backlight subsection.

FIG. 9 shows what the exemplary backlight 10 may look like once each of the luminance values has been stored and the corresponding subsections are driven at their proper luminance values (after Gamma correction has been performed, if necessary—see below for more information on Gamma correction). This may involve a conversion of the luminance values to current/voltage levels and can easily be accomplished by one skilled in the art by creating a linear relationship where luminance level 0 corresponds with 0 amps (or volts) and luminance level 255 corresponds to x amps (or volts), where x represents the power level that generates the maximum luminance from the LEDs). It can be easily observed from this figure that some subsections are fully on (white) while others are slightly gray to dark gray. The capability of dimming these sections of the backlight will save power as well as provide a deeper black/dark color since the backlight is not shining through the liquid crystal material at full luminance.

LCD subpixel voltages are typically determined based on a 'full on' backlight. Therefore, when sections of the backlight are dimmed, the subpixel voltages may need rescaled ('adjusted) to ensure that the picture fidelity remains high and the proper colors are produced by the display. One method for rescaling the LCD subpixel voltages is to divide the subpixel voltage by the ratio of proper luminance level to maximum luminance.

Figure 10:
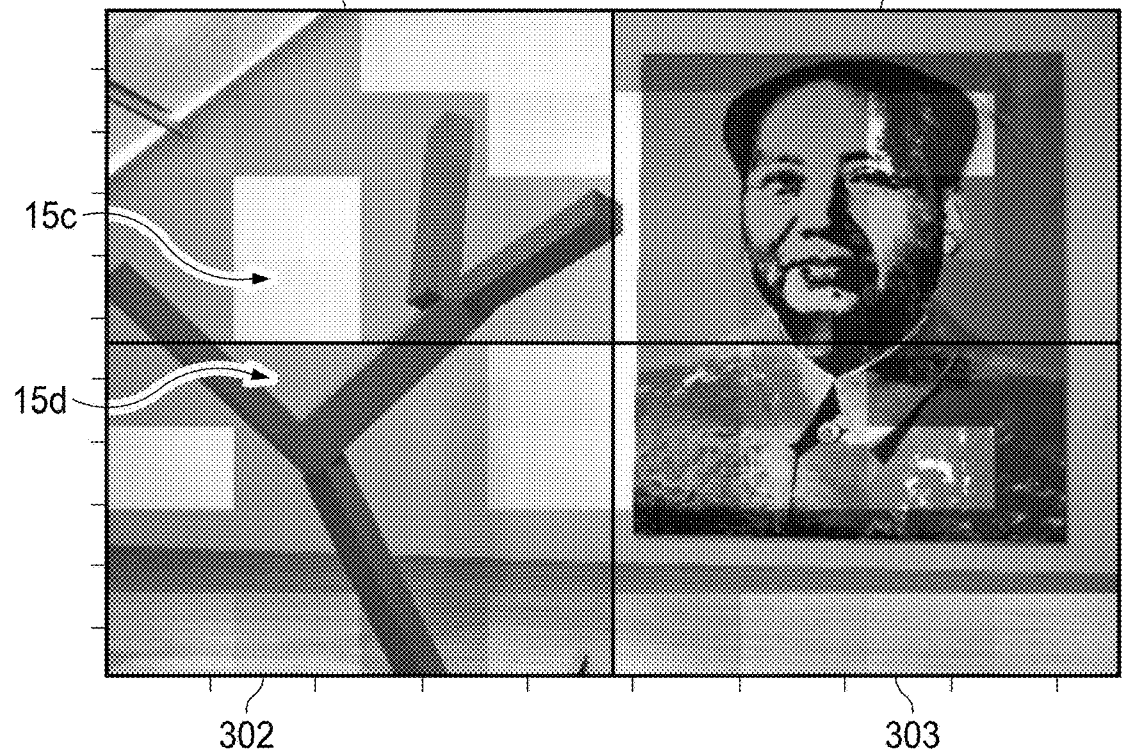
FIG. 10 is a front view of re-scaled LCD image data.

FIG. 10 shows the resulting LCD image data (without the adjusted backlight levels) once it has been rescaled based on the calculated backlight luminance levels. For example, subsection 15*c* shown in FIG. 9 may have a luminance level of 128. This would be 128 out of a possible 255 (maximum luminance), resulting in 128/255=approximately ½. As an illustration, assume that one of the subpixel voltages for subsection 15*c* was originally 1 mV. To rescale this subpixel voltage, divide 1 mV by ½. Now, the subpixel voltage should be 2 mV. Assuming use of a normally black LCD stack (i.e., voltage is required to orient the crystals to pass light), this increase in subpixel voltages is required because the backlight level has been decreased. Thus, from the figures and discussion above, it is known that the backlight level will decrease approximately 50% at subsection 15*c*, so in order to create the original colors in the image, the subpixel voltage must be increased in order to allow more light through the liquid crystals. The seemingly brighter resulting LCD image for subsection 15*c* can be observed in FIG. 10. Note, that FIG. 10 only shows the image data and does not take into account the actual backlight levels that are illuminating the LCD. Thus, although subsection 15*c* appears lighter, this will be accounted for once the new backlight levels are applied.

As a second example, subsection 15*d* shown in FIG. 9 may have a luminance level of 255 (maximum luminance). This would be 255/255, or 1. Thus, assuming any original subpixel voltage for subsection 15*d*, say V, the resulting scaled subpixel voltage would be identical because the backlight subsection remains at full on (i.e., V/1=V). This can be observed in FIG. 9 as the subsection 15*d* appears white. Similarly, subsection 15*d* in FIG. 10, appears identical to the original image in FIG. 6 because the backlight remains at 'full on', meaning the subpixel voltages will not have been altered from their original settings.

Figure 11:
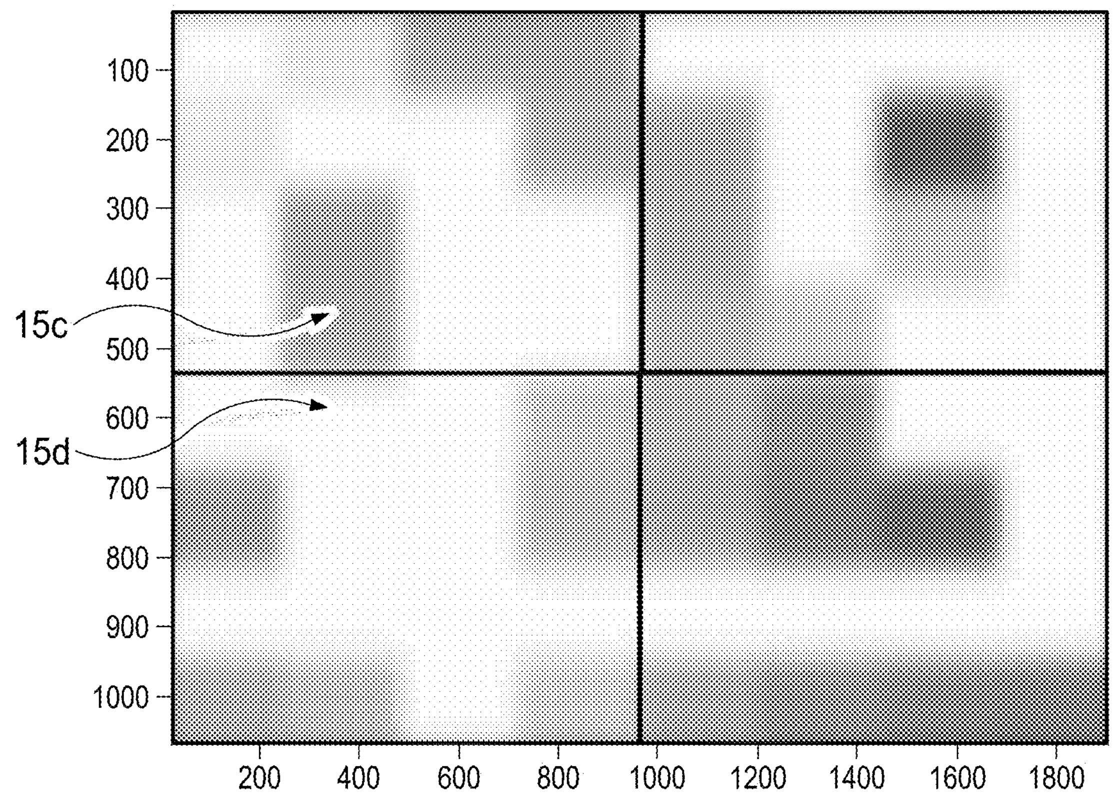
FIG. 11 is a front view of the backlight from FIG. 9 after diffusion.
Figure 12:
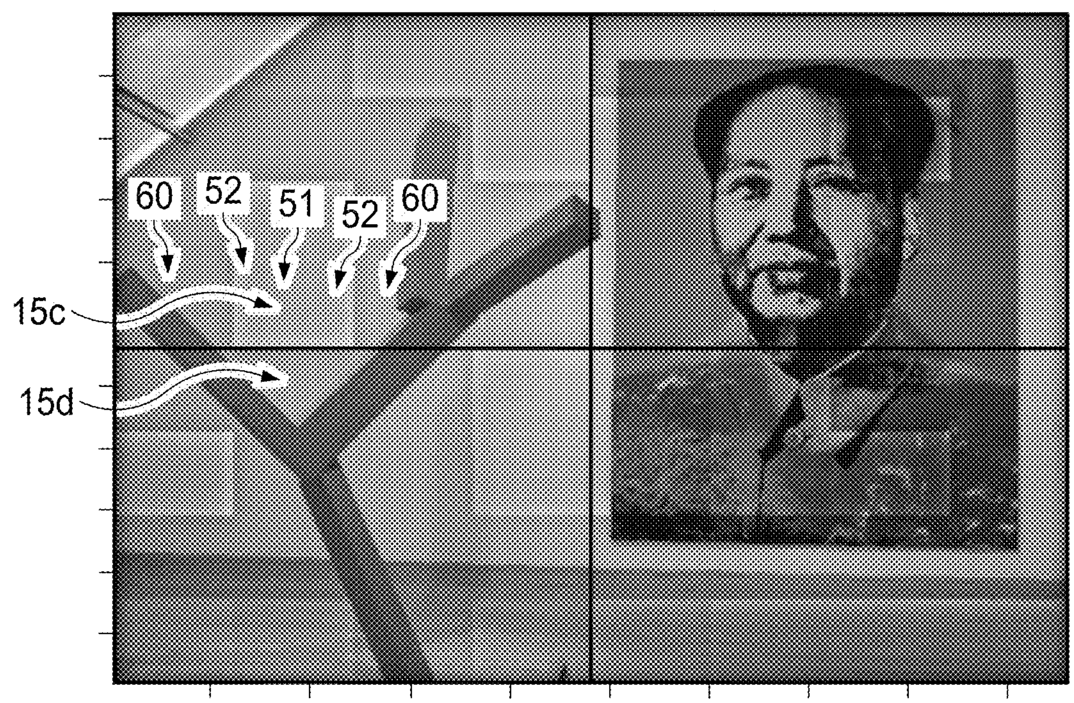
FIG. 12 depicts the image resulting from combining the diffuse backlight of FIG. 11 with the rescaled LCD image of FIG. 10.

It is common in LCD assemblies to place a light diffusing/scattering element (hereinafter 'diffuser') in between the backlight and the liquid crystal material in order to provide a more uniform appearance of light through the display. Without the diffuser, the LED point-sources of light may be visible through the final display. When the backlight from FIG. 9 is placed behind a diffuser, the resulting luminance pattern may appear as shown in FIG. 11. Further, when the diffused backlight from FIG. 11 is placed behind the rescaled LCD image data from FIG. 10, the resulting LCD image may appear as shown in FIG. 12.

As can be easily observed, the diffusing properties alter the actual luminance levels of the backlight, especially near the edges of the various subsections. Using subsection 15*c* as an example, it can be seen that the luminance level in the center 51 is acceptable, while the luminance level near the edges 52 has been increased due to 'bleed over' from brighter adjacent subsections 60.

One discovered method of accounting for this phenomenon is the creation of a 'virtual backlight' ('VB') where the 'bleed over' behavior of adjacent subsections can be mathematically modeled and accounted for during rescaling of the LCD subpixel voltages. There are many possible methods that may be used to mathematically model a given backlight in order to create a VB.

Figure 13:
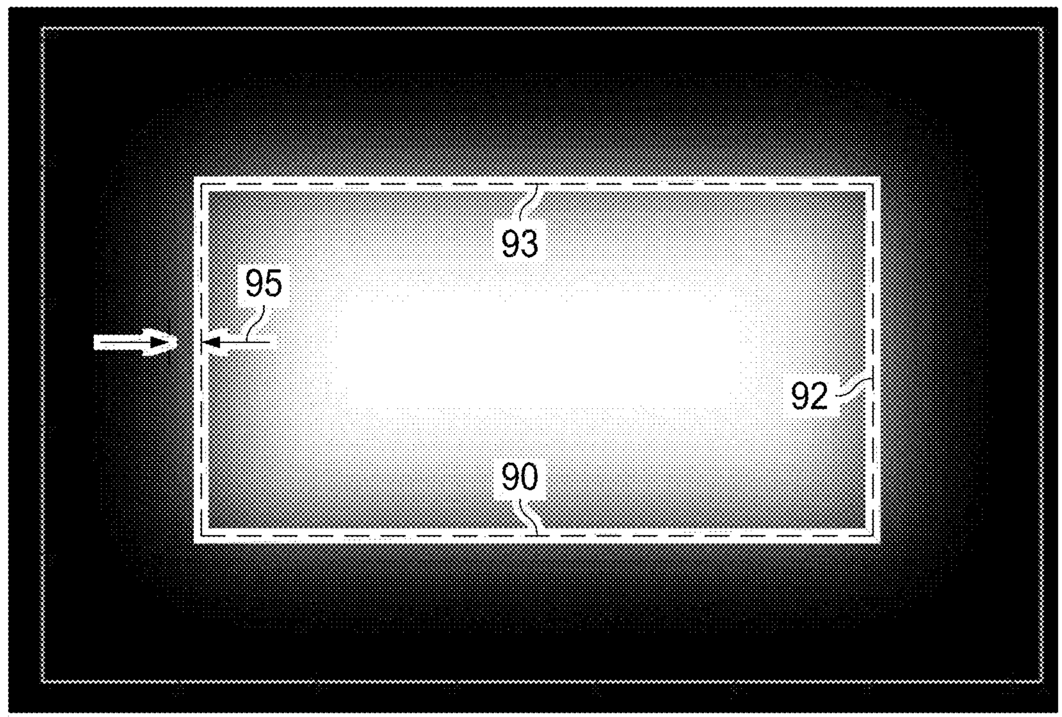
FIG. 13 a surface plot of a fully illuminated subsection of the exemplary backlight that has been convolved with a Gaussian filter.

One method for creating the VB may be referred to as a 'virtual subsections' method and is based on the use of a stored matrix of data that represents the appearance of a single, fully illuminated subsection in the backlight assembly as seen through the diffuser. FIG. 13 provides a surface plot of a fully illuminated subsection 90 that has been convolved with a Gaussian filter. The subsection 90 has a width (W) 93, height (H) 92, and a surrounding tail (T) 95, where W, H, and T are each measured in pixels. The tail 95 represents the subpixels that may be impacted by the luminance from adjacent subsections of the backlight—in other words, illumination of the subsection that extends beyond the physical edge of the subsection 90. Thus, the dimensions of the stored matrix for the subsection would be (2T+W)×(2T+H). Because the virtual subsection is larger than the actual subsection 90, the adjacent subsections may be overlapped and the principle of additive light may be used to blend the edges of the subsections.

Figure 14:
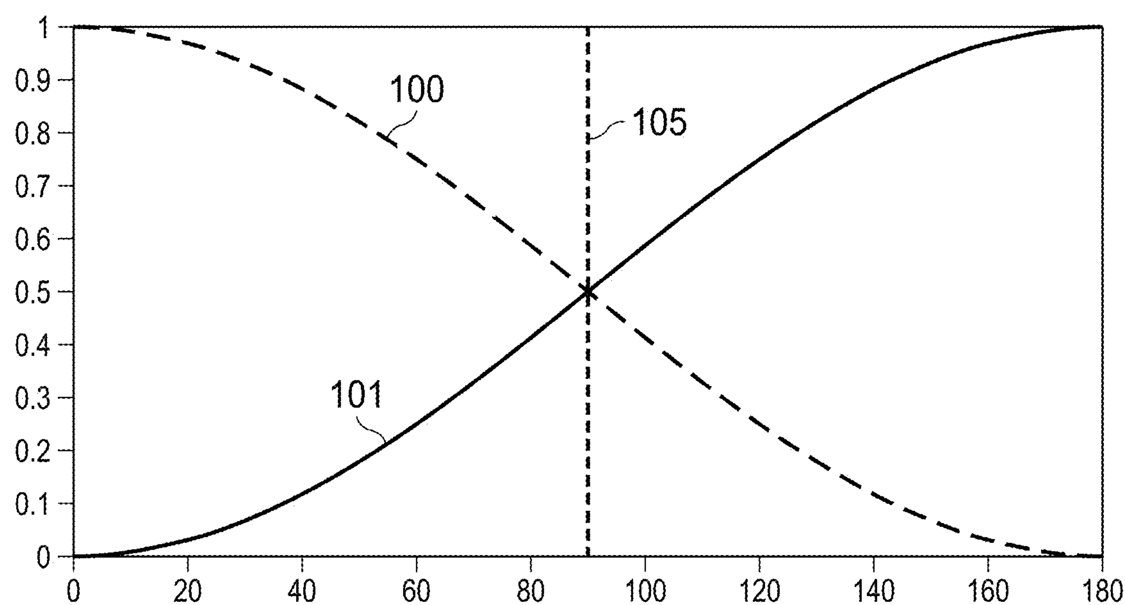
FIG. 14 is a plot of relative luminance versus physical position on a pair of adjacent subsections when using a virtual subsection method.

FIG. 14 illustrates the relative luminance versus physical position on a pair of adjacent subsections. The x-axis of this figure represents the pixel location while the y-axis represents the relative luminance of the backlight subsections. Relative luminance refers to the percentage of the backlight luminance Y, which may be determined for the subsection through a technique discussed above. Thus, 0.5 would represent one-half of the luminance, 0.25 would represent one-quarter of the luminance, etc. The plot for a first subsection 100 and an adjacent second subsection 101 are shown. The line 105 represents the physical dividing line between the subsections. Looking at the first subsection 100, at pixel zero the full luminance level is recorded. The relative luminance decreases as the pixel location increases (as we approach the division between the subsections 105). At pixel 90, only half of the full luminance level is recorded. As the pixel location continues to increase (as we move away from the division between the subsections 105) the relative luminance continues to decrease until it reaches zero at pixel 180. Thus, for this example, the tail T of each subsection may be 90 pixels long. A symmetrically-opposite trend can be seen with the plot for the adjacent subsection 101.

It should be noted that because the plot for the adjacent subsections 100 and 101 are symmetrical about line 105 and about the relative luminance of 0.5, if the subsections were driven to the same backlight luminance level they would blend to create 100% luminance across the line 105 between the subsections. Obviously, at line 105 the VB data for each subsection is at 0.5 or 50% of the backlight luminance for that subsection, so if each subsection were driven to the same backlight luminance, the additive effect would create the same luminance level across the dividing line 105 between the subsections. If the subsections were driven to different luminance levels, as the VB data is entered, this will blend between the different luminance levels. For example, at pixel location 38 within subsection 100, the VB data should be 90% of the luminance for subsection 100 plus 10% of the luminance for subsection 101.

The relationship shown in FIG. 14 is only applied to adjacent subsection edges and to subpixels that are within the 'tail' portion of the adjacent subsections. Thus, subsection edges that are not adjacent to any other subsections (e.g., along the perimeter of the overall display) may not have this relationship and may simply use 100% of the luminance level as the VB data for that subsection.

By using the luminance values for each backlight subsection along with the model for backlight luminance along the subsection edges, an array of VB data for each subsection can be stored and then combined to create a larger array which contains VB data for each pixel in the display. As discussed above, the original subpixel voltages may then be divided by the ratio of VB data over the maximum backlight value in order to properly rescale the original LCD image data.

It should be noted that although a gaussian curve has been used in FIG. 14 to represent the relationship between adjacent subsections, this is not required. For some embodiments, a linear relationship or exponential function may provide a more appropriate mathematical representation of the relationship between adjacent subsections of the diffused backlight. Other mathematical models are discussed below. In this regard, it should also be noted that either a mathematical system can be derived to model an existing physical backlight, or a physical backlight may be designed so that it performs similar to a selected mathematical model.

Figure 15:
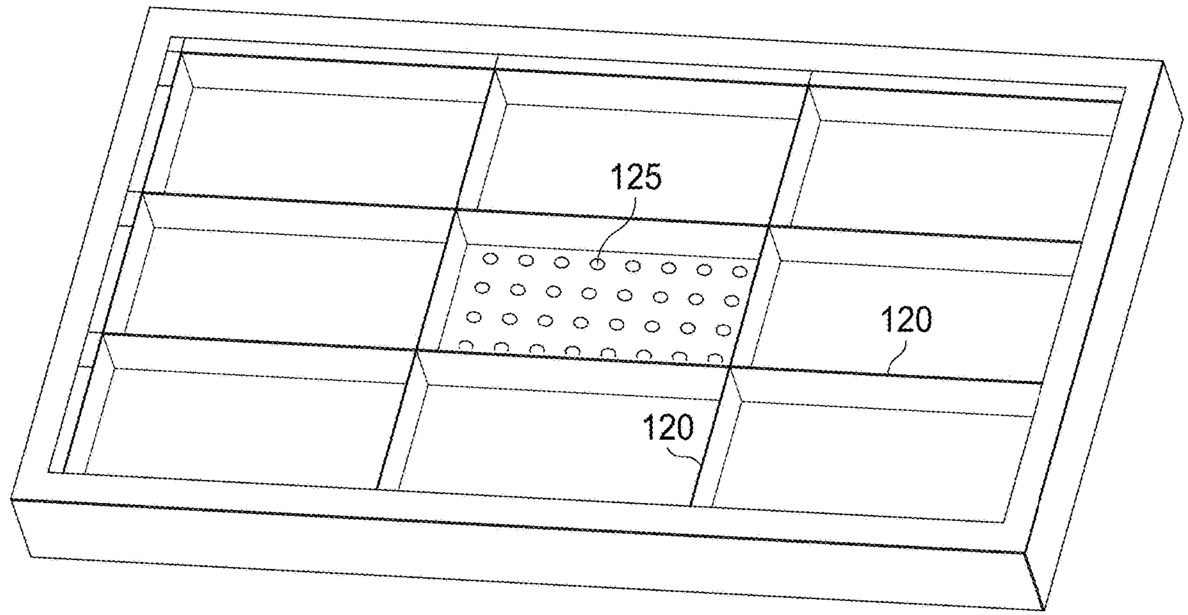
FIG. 15 is a perspective view of one embodiment for controlling the ‘bleeding’ of light between adjacent subsections of an exemplary backlight.

If using the gaussian relationship shown in FIG. 14, it may be advantageous to design the physical system such that the illustrated relationship between adjacent subsections actually exists. For example, in such a case the backlight and diffuser should be designed so that only 50% luminance exists at the overlapping edge of each subsection. FIG. 15 shows one method for accomplishing this specific embodiment, where an array of dividing walls 120 has been used between backlight LEDs 125 and a diffusing element (not shown). FIG. 15 is a simplified figure showing only a 3×3 array, and does not show LEDs in every subsection. However, as discussed above, the number of backlight subsections can vary depending on many different factors, and one skilled in the art can easily modify the simplified embodiment of FIG. 15 into an 8×8 array (or any other arrangement) with LEDs in every subsection.

Preferably, there would be a gap between the end of the dividing walls 120 and the diffuser. This would prevent any of the dividing walls 120 from being visible through the final display. The precise geometry of the dividing walls 120 and their relationship to the diffuser may require fine tuning for each display. As an example, acceptable results have been produced for 70 inch LCD displays when the dividing walls 120 are about two to three inches high with a gap between the dividing wall 120 and diffuser of 30-40 mm.

As mentioned above, other mathematical models may be used to simulate the backlight through the diffuser. One such other method is to use a point spread function (PSF). If the diffuser is treated like an optical low pass filter, then a 2D filter operation can be performed on the virtual backlight. One could also modify the PSF by observing that a diffused backlight only requires a blurring operation along the boundaries between subsections.

Figure 16:
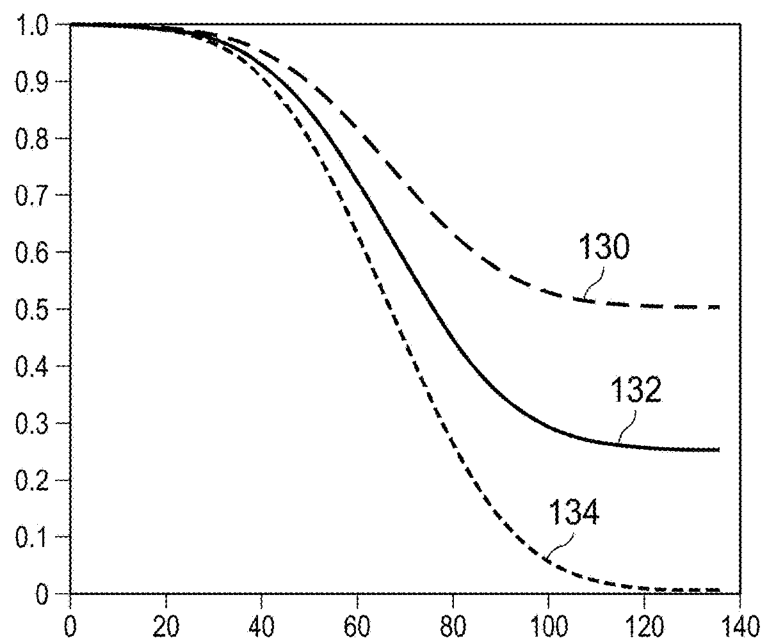
FIG. 16 is a plot of relative luminance versus physical position on subsections when using pre-determined brightness profiles.

As represented in FIG. 16, an examination of the edges between a fully illuminated subsection and an adjacent dimmer subsection constructed via a Gaussian Point Spread Function technique reveals a series of common curves. FIG. 16 shows the change in relative illumination from 1 to 0.5 (curve 130), 1 to 0.25 (curve 132), and 1 to 0 (curve 134). If Z(x) is demoted as the curve that goes from 1 to zero, then it is possible to recreate any change in brightness between adjoining subsections with the equation:

$$f(x)=y_1+Z(x)\cdot(y_0-y_1),$$

where $y_0$ is the brightness of the starting subsection and $y_1$ is the brightness of the ending subsection.

Thus, an exemplary two-step point spread function technique may include: (1) creating a series of changing brightness lines that run vertically down the middle of each subsection using the above equation, noting that if the subsections are rectangular, a "longer" brightness function will be required for this operation; and (2) starting at the top of the VB, creating a series of horizontal brightness curves using the data from step 1 as the endpoints for each curve.

Another exemplary technique for producing a virtual backlight involves the use of Bezier Curves. In this approach, cubic splines may be used to interpolate between the subsection centers and thus simulate diffusion. For each point in the VB, the following equation would be calculated:

$$B(t)=(1-t)^3P_0+3t(1-t)^2P_1+3t^2(1-t)P_2+t^3P_3, t\in[0,1].$$

As discussed above, once the data for the VB has been generated, it may be divided into the corresponding subpixel voltages in order to properly rescale the LCD video image. This can be accomplished in many ways. Because division is typically a time-consuming operation, one exemplary embodiment may use a 256 byte lookup table of 8-bit scaling factors. These would be multiplied by each pixel and then followed by an 8-bit shift. The 8-bit shift can be skipped if only the upper byte of the product is used. If an overflow occurs, the resulting pixel value would be 255.

Before driving the backlight subsections with the appropriate luminance values, gamma correction may be applied. This step may help correct the contrast and may also provide additional power savings. Assuming backlight intensities from 0 to 255, one method of gamma correction may be: $I=255\cdot(Y/255)^\gamma$ where $\gamma$ is typically equal to 2.2 (but this may be varied depending on the application). For example, assuming that the luminance value (Y) for a subsection is calculated to be 128, when this value is used in the gamma correction equation above, the actual intensity of the backlight (I) is calculated to be 56. This backlight intensity (I) can then be converted to actual voltage/current and sent to the appropriate backlight subsection. Also, the re-scaled image data can then be sent to the LCD as the backlight is updated.

It should be noted that the exemplary systems and methods described herein have been described with reference to each 'frame', and in an exemplary embodiment the backlight subsections would be updated for each 'frame.' However, there are many different video frame rates in existence as well as different LCD display refresh rates (e.g., 60 Hz, 120 Hz, 240 Hz, etc.). As used herein then, the term 'frame' merely represents each time the pixel voltages are updated for the LCD display. Thus, the backlight subsections should preferably be updated (and the LCD subpixel voltages re-scaled) each time that a new set of subpixel data is sent to the LCD display.

Having shown and described various exemplary embodiments, those skilled in the art will realize that many variations and modifications may be made to affect the described embodiments and still be within the scope of the claims. Thus, many of the elements described above may be altered or replaced with different elements that will provide the same result and fall within the spirit of the claimed embodiments. It is the intention, therefore, to limit the inventive concept only as indicated by the scope of the claims.

What is claimed is:

1. A method for controlling a dynamic dimming liquid crystal display (LCD) backlight of a LCD assembly having a plurality of discrete LCDs positioned in front of the backlight, each LCD having a discrete display receiver board configured to deliver received video content to the LCD, the method comprising:

dividing the backlight into an array of individually controllable subsections;

using adjacent edges of the LCD displays as virtual boundary lines relative to the backlight subsections;

placing each display receiver board in electrical communication with one or more of the other receiver boards;

determining an initial desired luminance value for each subsection of the backlight based on incoming video data supplied to the LCDs;

(a) calculating the difference between desired luminance values for each pair of adjacent backlight subsections that border the virtual boundary lines;

(b) comparing the calculated difference in desired luminance values for each pair of adjacent backlight subsections to a predetermined threshold value; and (c) when the calculated difference in desired luminance values between a pair of adjacent backlight subsections exceeds the threshold value, increasing the desired luminance value for the backlight subsection having a lower desired luminance value by adding a constant value to the existing desired luminance value of said subsection.

2. The method of claim 1, wherein the desired luminance value for the backlight subsection having a lower desired luminance value is also increased when the calculated difference in desired luminance values between a pair of adjacent backlight subsections is equal to the threshold value.

3. The method of claim 1, wherein all backlight subsections not having an increased desired luminance value are driven at the original desired luminance value.

4. The method of claim 1, wherein the threshold value is between 20% and 90% of the possible range of desired luminance values.

5. The method of claim 1, wherein the constant value is some fixed percentage of the threshold value.

6. The method of claim 1, wherein the constant value is selected from a lookup table, the constant values in the lookup table varying with the magnitude of the calculated difference in desired luminance values.

7. The method of claim 1, further comprising performing gamma correction.

8. The method of claim 1, further comprising rescaling LCD subpixel voltage.

9. The method of claim 8, wherein subpixel voltage rescaling is accomplished by dividing the voltage of a given subpixel by the ratio of the desired luminance value for said subpixel to the maximum possible luminance value for said subpixel.

10. The method of claim 8, further comprising creating a virtual backlight that allows bleed over behavior of adjacent backlight subsections to be mathematically modeled and accounted for during rescaling of subpixel voltages.

11. The method of claim 10, wherein:

the virtual backlight is created using virtual subsections that are based on the use of a stored matrix of data that represents the appearance of a single, fully illuminated backlight subsection as seen through a diffuser;

each virtual subsection is larger than the actual backlight subsection it represents, such that adjacent subsections may be overlapped; and the principle of additive light may be used to blend the edges of the subsections.

12. The method of claim 1, further comprising repeating steps (a)-(c) on subsequent video frames after all of any backlight subsection desired luminance value increases are completed for a current video frame.

13. The method of claim 1, wherein the electrically communicating display receiver boards share desired luminance value information.

14. The method of claim 13, wherein the display receiver boards share desired luminance value information about backlight subsections that lie across virtual boundary lines.

15. The method of claim 1, wherein each display receiver board receives video content from an associated, discrete video player.

16. A method for controlling a dynamic dimming liquid crystal display (LCD) backlight of a LCD assembly, the backlight divided into an array of individually controllable subsections, and a plurality of discrete LCDs positioned in front of the backlight with adjacent edges of the LCDs defining virtual boundary lines relative to the backlight subsections, the method comprising:

providing each LCD with a discrete display receiver board and a discrete video player, the video player supplying the display receiver board with video content and the display receiver board supplying the video content to its associated LCD;

placing each display receiver board in electrical communication with one or more of the other receiver boards;

determining an initial desired luminance value for each subsection of the backlight based on incoming video data supplied to the LCDs, wherein the desired luminance value is between off and a maximum luminance value;

calculating the difference between desired luminance values for each pair of adjacent backlight subsections that border the virtual boundary lines;

comparing the calculated difference in desired luminance values for each pair of adjacent backlight subsections to a predetermined threshold value;

when the calculated difference in desired luminance values between a pair of adjacent backlight subsections exceeds the threshold value, increasing the desired luminance value for the backlight subsection having a lower desired luminance value by multiplying the calculated difference in desired luminance values by some predetermined fraction;

driving all backlight subsections not having an increased desired luminance value at the initially determined desired luminance value;

rescaling the voltage of any LCD subpixels that overlie a backlight subsection operating at less than the maximum luminance value; and creating a virtual backlight that allows bleed over behavior of adjacent backlight subsections to be mathematically modeled and accounted for during rescaling of the LCD subpixel voltages; wherein the communicating display receiver boards share desired luminance value information about backlight subsections that lie across virtual boundary lines.

17. The method of claim 16, wherein the desired luminance value for the backlight subsection having a lower desired luminance value is also increased when the calculated difference in desired luminance values between a pair of adjacent backlight subsections is equal to the threshold value.

18. The method of claim 16, wherein subpixel voltage rescaling is accomplished by dividing the voltage of a given subpixel by the ratio of the desired luminance value for said subpixel to the maximum possible luminance value for said subpixel.

19. The method of claim 16, wherein:

the virtual backlight is created using virtual subsections that are based on the use of a stored matrix of data that represents the appearance of a single, fully illuminated backlight subsection as seen through a diffuser;

each virtual subsection is larger than the actual backlight subsection it represents, such that adjacent subsections may be overlapped; and the principle of additive light may be used to blend the edges of the subsections.

20. The method of claim 16, wherein the display receiver board of a given LCD only communicates with display receiver boards of other LCDs adjacent to the given LCD.

* * * * *